United States Patent
Park et al.

(10) Patent No.: US 7,295,718 B2
(45) Date of Patent: Nov. 13, 2007

(54) NON-LINEAR QUANTIZATION AND SIMILARITY MATCHING METHODS FOR RETRIEVING IMAGE DATA

(75) Inventors: Soo-Jun Park, Seoul (KR); Chee Sun Won, Seoul (KR); Dong-Kwon Park, Seoul (KR); Hyunjin Kim, Taejon (KR); Sung Hee Park, Taejon (KR); Myung Gil Jang, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 459 days.

(21) Appl. No.: 09/978,668

(22) Filed: Oct. 18, 2001

(65) Prior Publication Data

US 2002/0136454 A1   Sep. 26, 2002

(30) Foreign Application Priority Data

Oct. 21, 2000   (KR) ............... 2000-62137

(51) Int. Cl.
*G06K 9/54*   (2006.01)
*G06K 9/00*   (2006.01)

(52) U.S. Cl. ..................... 382/305; 382/170

(58) Field of Classification Search ............. 382/168, 382/170, 305
See application file for complete search history.

(56) References Cited

U.S. PATENT DOCUMENTS 6,072,904 A   6/2000   Desai et al.

FOREIGN PATENT DOCUMENTS

| JP | 07-046408 | 2/1995 |
|----|-----------|--------|
| WO | 97/40630  | 10/1997 |
| WO | 99/35596  | 7/1999 |

OTHER PUBLICATIONS

Abdel-Mottaleb. "Image retrieval based on edge representation." Proceedings of the International Conference on Image Processing. vol. 3, Sep. 2000, pp. 734-737.*
Park et al., "Efficient Use of Local Edge Histogram Descriptor", Proceedings ACM Multimedia Conference, Nov. 4, 2000, pp. 51-54.

(Continued)

*Primary Examiner*—Colin LaRose
(74) *Attorney, Agent, or Firm*—Lowe Hauptman Ham & Berner LLP

(57) ABSTRACT

A method for constructing a database having image information representing a plurality of images including the steps of: a) calculating L×5 number of normalized edge histogram bins to generate L number of edge histograms of a target image, wherein each edge histogram has five normalized edge histogram bins and represents a spatial distribution of five reference edges in a sub-image and L is a positive integer, wherein the reference edges include four directional edges and a non-directional edge; b) non-linearly quantizing the L×5 number of normalized edge histogram bins to generate L×5 number of quantization index values for the target image; c) storing the L×5 number of quantization index values to the database; and d) repeating the steps a) to c) until all of the stored images are processed to thereby construct the database having the image information.

40 Claims, 12 Drawing Sheets

OTHER PUBLICATIONS

Park et al., "Core Experiments on MPEG-7 Edge Histogram Descriptors", ISO/IEC JTC1/SC29/WG11, May 2000.

Park et al., "Core Experiments on MPEG-7 Edge Histogram Descriptors", ISO/IEC JTC1/SC29/WG11, Jul. 2000.

Jain et al.; *Image Retrieval Using Colar and Shape*; May 15, 1995; Dept. of Computer Science, Michigan State University.

Stuart P. Lloyd; Least Squares Quantization in PCM; IEEE Transactions on Information Theory, vol. II-28, No. 2, Mar. 1982.

Japanese Office Action for 2002-536846.

* cited by examiner

VERTICAL

HORIZONTAL

45-DEGREE

135-DEGREE

NON-DIRECTIONAL

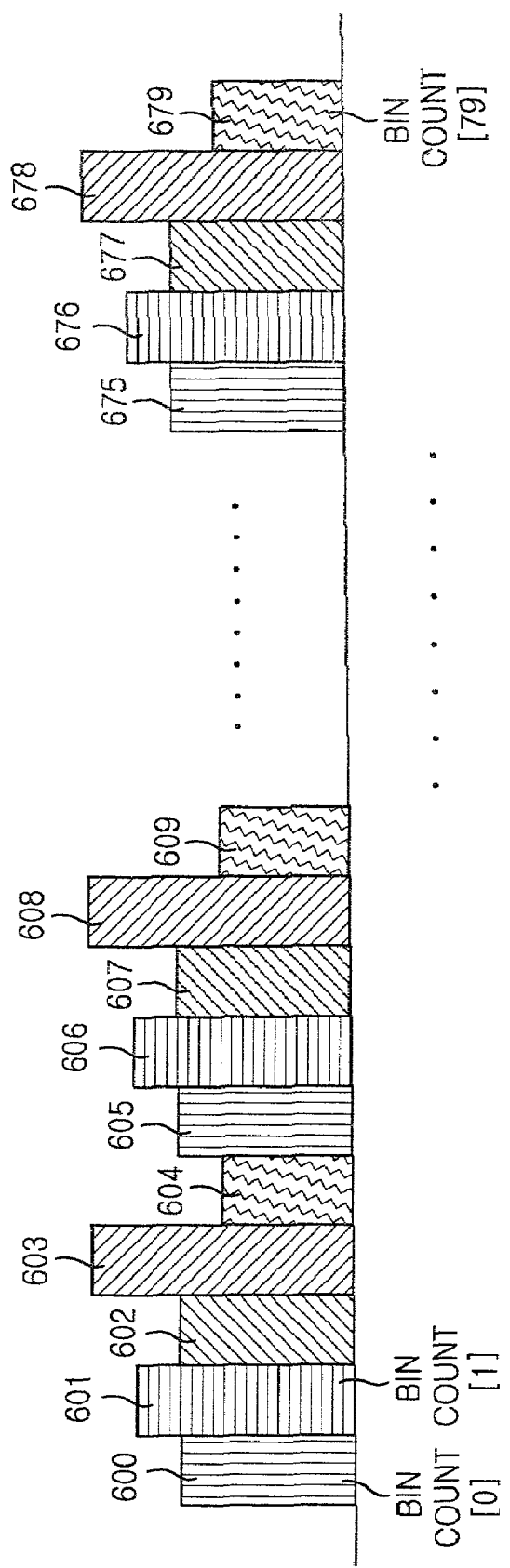

NON-LINEAR QUANTIZATION AND SIMILARITY MATCHING METHODS FOR RETRIEVING IMAGE DATA

FIELD OF THE INVENTION

This invention relates to a method for retrieving image data; and, more particularly, to a method for constructing a bit-representation of an edge histogram descriptor having reduced bits and a method for retrieving image data by using the information effectively extracted from the coded representation of the descriptor.

DESCRIPTION OF THE PRIOR ART

The Joint Photographic Experts Group (JPEG) is the international standard for still images and the Moving Picture Experts Group-1 (MPEG-1), 2 are the standard for moving pictures. Regarding compressed image information, feature information for each image is extracted for applications such as extracting a key frame, image search, browsing or the like.

To extract the feature information, brightness or color histograms are widely used. The brightness and color histograms, respectively, represent relative frequency of brightness and color (red, green or blue) in an image. Especially, various methods of histogram comparison have been recently proposed for searching still images or digital videos that are stored digitally. As the histograms are used for image search and shot boundary detection, conventional histograms are to be improved. That is, it is necessary to adopt a histogram descriptor such as an edge histogram, which can represent the image content more efficiently. Also, the binary representation of the descriptor should be compact and the computational complexity for the similarity matching should be low.

A method of employing color histograms and edge maps for shot boundary detection is disclosed in U.S. Pat. No. 5,805,733 entitled "Method and system for detecting scenes and summarizing video sequences". Though the method is effective in that color information relative to a human visual system is extracted, the method does not include extraction of brightness information.

A method in which color information is received and then indexed by measuring the similarity of images using histogram intersection technique is disclosed in an article by M. J. Swain, et al., "Color Indexing", *International Journal of Computer Vision*, Vol. 7-1, pp.11-32, 1991. However, this method does not use brightness and edge information and thus accuracy is not guaranteed. Also, since the histograms are generated using a discrete quantization technique in the conventional methods, a relatively large number of histogram bins are necessary to make equal performance. Consequently, inefficiency in storage and similarity measurement results. In addition, because feature extraction is conventionally performed in terms of pixels, there is a problem in that feature information is restrictively generated.

In the meantime, as the histogram is widely used for image searching, etc., recently, an efficient way of storing histogram information is required. According to a conventional way to store the histogram, a histogram bin value is stored in a storage field of fixed size by normalization using linear quantization. Consequently, this method of linear quantization to the histogram storage causes a problem as the quantity of bits is increased.

SUMMARY OF THE INVENTION

It is an object of the present invention to provide a method for constructing a database having image information representing a plurality of images with fewer bits to be stored in the database.

It is another object of the present invention to provide a method for retrieving corresponding images in response to a query image based on a database with a high retrieval speed and accuracy.

In accordance with one aspect of the present invention, there is provided a method for constructing a database having image information representing a plurality of images, the method comprising the steps of: a) calculating L×5 number of normalized edge histogram bins to generate L number of edge histograms of a target image, wherein each edge histogram has five normalized edge histogram bins and represents a spatial distribution of five reference edges in a sub-image and L is a positive integer, wherein the reference edges include four directional edges and a non-directional edge; b) non-linearly quantizing the L×5 number of normalized edge histogram bins to generate L×5 number of quantization index values for the target image; c) storing the L×5 number of quantization index values to the database; and d) repeating the steps a) to c) until all of the stored images are processed to thereby construct the database having the image information.

In accordance with another aspect of the present invention, there is provided a method for retrieving corresponding images in response to a query image based on a database, the method comprising the steps of: a) calculating L number of local edge histograms of the query image as an image descriptor for the query image, wherein each local edge histogram represents a spatial distribution of five reference edges in a sub-image and L is a positive integer, wherein the reference edges include four directional edges and a non-directional edge; b) extracting a plurality of image descriptors for target images based on image information from the database, wherein the image descriptor for each target image includes L number of local edge histograms for each target image; c) comparing the image descriptor for the query image with each image descriptor for the target images to generate a comparison result; and d) retrieving at least one target image similar to the query image based on the comparison results.

BRIEF DESCRIPTION OF THE DRAWINGS

Other objects and aspects of the invention will become apparent from the following description of the embodiments with reference to the accompanying drawings, in which:

FIG. 6 is an explanatory diagram illustrating an array of 80 edge histogram bins corresponding to an image;

DETAILED DESCRIPTION OF THE PREFERRED EMBODIMENTS

Hereinafter, preferred embodiments in accordance with the present invention will be described in detail referring to the accompanying drawings.

Figure 1:
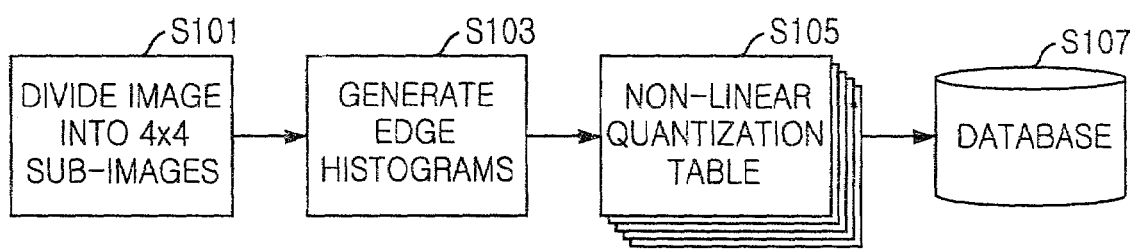
FIG. 1 is a block diagram illustrating a process for constructing a database having a plurality of image descriptors for corresponding images in accordance with the present invention.

Referring to FIG. 1, there is shown a block diagram illustrating a process for constructing a plurality of image descriptors for corresponding images in accordance with the present invention.

At the processing block S101, an image to be processed is inputted and divided into N×N sub-images, e.g., 4×4 sub-images, wherein N is a positive integer. The sub-images are then coupled to a processing block S103 where a first image descriptor for the image is extracted. That is, an edge histogram for each sub-image is obtained by using a multiplicity of edges and then 80 normalized local edge histogram bins for the image are coupled to the processing block S105 as the first image descriptor.

At the processing block S105, the first image descriptor is non-linearly quantized to thereby generate a corresponding second image descriptor which is, e.g., a group of quantization index values.

Thereafter, the second image descriptor for the image is inputted and stored in a database S107. The above process is repeated until all of the images to be represented using the second descriptors are processed.

Referring to FIGS. 2 to 6, there are shown explanatory diagrams for illustrating a process for obtaining the first image descriptor described referring to FIG. 1.

Figure 2:
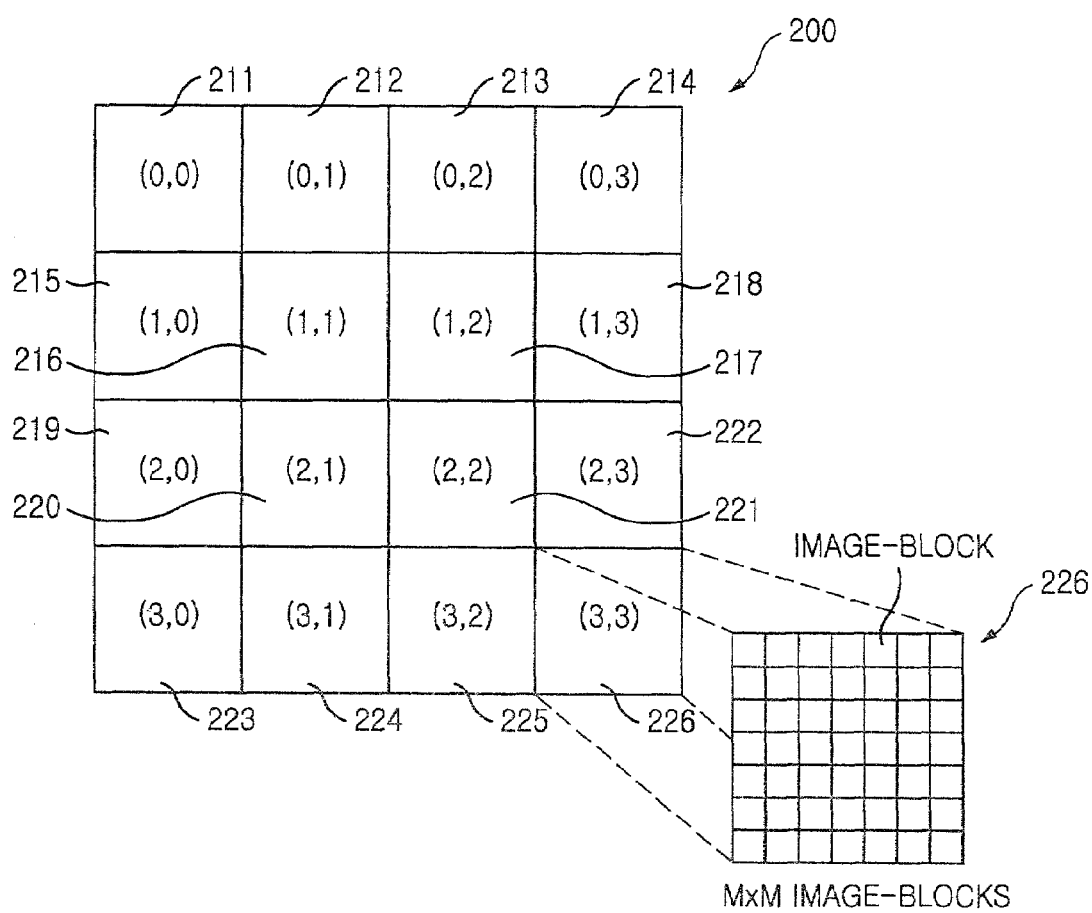
FIG. 2 shows an explanatory diagram depicting an image having 16 sub-images to be represented by image descriptors.
Figure 3A:
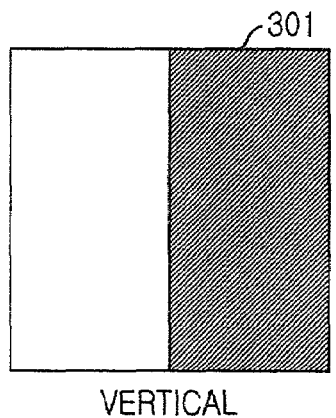
FIGS. 3A to 3E illustrate five types of edges to be used for an edge determination process in accordance with the present invention.
Figure 3B:
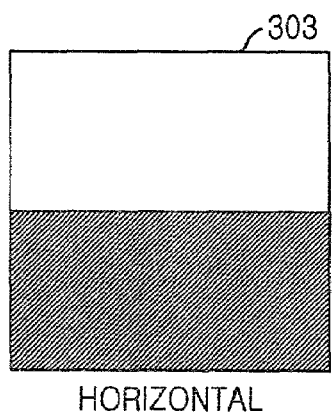
Figure 3C:
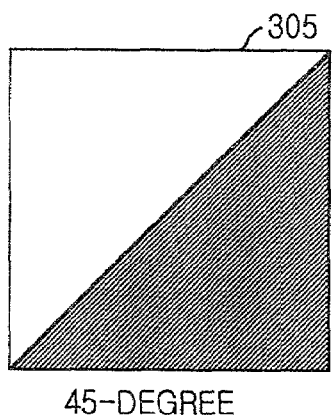
Figure 3D:
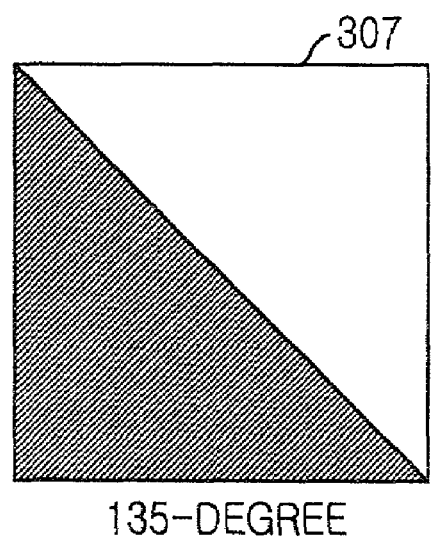
Figure 3E:
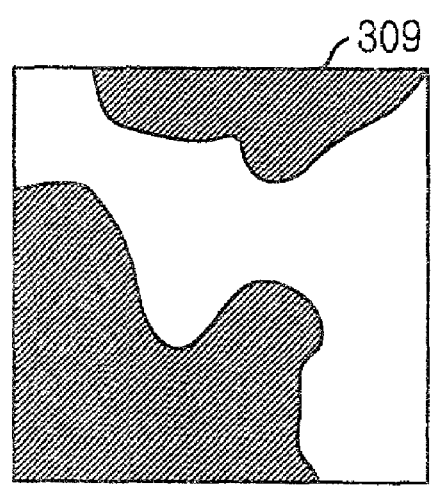

As shown in FIG. 2, in order to obtain a corresponding first image descriptor, an inputted image 200 is divided into N×N non-overlapping sub-images. In the example shown, the image is divided into 4×4 sub-images, to thereby form 16 rectangular sub-images 211 to 226. Each of the sub-images contains a plurality of pixels.

As described hereinbefore, the first image descriptor represents normalized edge histogram bins for generating the edge histogram for each sub-image wherein the edge histogram represents the spatial distribution of edges in the sub-image.

In order to extract the edge histogram, each sub-image is then divided into M×K non-overlapping rectangular image-blocks wherein the size of the image-blocks depends on the size of the image. Each image-block is used in an edge determination process, in which an image-block is described by using one of its edges.

In accordance with one embodiment of the present invention, as shown in FIGS. 3A to 3E, the edge determination process is provided with five edges, one of which is selected for an image-block. The edges can include various types of directional edges, preferably, vertical, horizontal, 45 degree and 135 degree edges 301, 303, 305 and 307; and a non-directional edge 309 including at least one edge of undesignated direction.

In order to generate an edge histogram for a sub-image, it is necessary to detect an edge feature from an image-block. That is, the edge determination process is performed in order to determine which one of the edges can be assigned to an image-block. The extraction can be performed using a method applying digital filters in the spatial domain.

Figure 4:
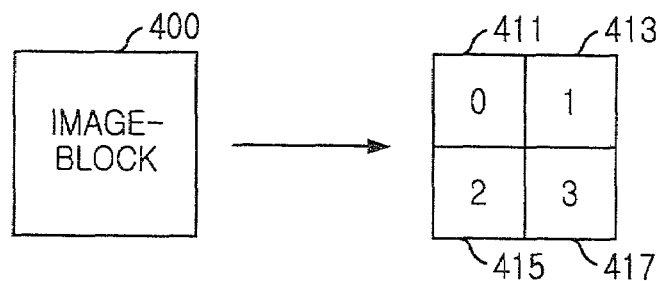
FIG. 4 is an explanatory diagram demonstrating an image-block partitioned into four sub-blocks, to each of which filter coefficients are assigned.
Figure 5A:
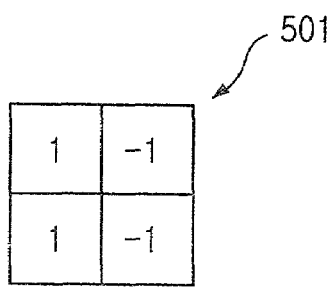
FIGS. 5A to 5E show image-blocks, wherein sub-blocks of each image-block are provided with corresponding filter coefficients for five edges.
Figure 5B:
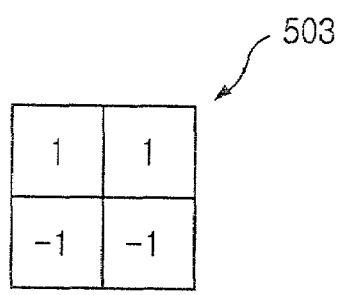
Figure 5C:
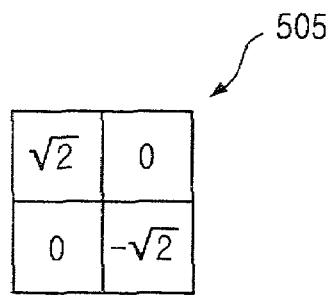
Figure 5D:
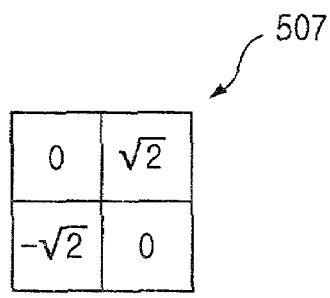
Figure 5E:
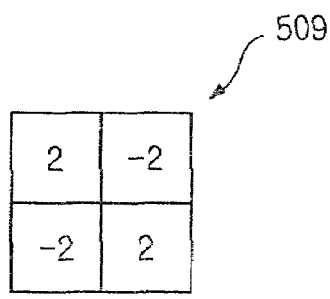

In the edge determination process, as shown in FIG. 4, an image-block is partitioned into four sub-blocks. That is, as shown, a reference numeral 400 denotes an image-block and reference numerals 411, 413, 415 and 417 denote sub-blocks also labeled 0, 1, 2 and 3, respectively, for the image-block 400, wherein a corresponding filter coefficient is assigned to each sub-block to be able to obtain a set of edge magnitudes.

In accordance with one embodiment of the present invention, each image-block 400 is partitioned into 2×2 sub-blocks each of which is labeled 0, 1, 2 or 3.

For each image block, a set of five edge magnitudes corresponding to five types of edges are obtained by using the following equations:

$$m_v(i,j) = \left| \sum_{k=0}^{3} a_k(i,j) \times f_v(k) \right| \qquad \text{Eq. 1}$$

$$m_h(i,j) = \left| \sum_{k=0}^{3} a_k(i,j) \times f_h(k) \right| \qquad \text{Eq. 2}$$

$$m_{d-45}(i,j) = \left| \sum_{k=0}^{3} a_k(i,j) \times f_{d-45}(k) \right| \qquad \text{Eq. 3}$$

$$m_{d-135}(i,j) = \left| \sum_{k=0}^{3} a_k(i,j) \times f_{d-135}(k) \right| \qquad \text{Eq. 4}$$

$$m_{nd}(i,j) = \left| \sum_{k=0}^{3} a_k(i,j) \times f_{nd}(k) \right| \qquad \text{Eq. 5}$$

where $m_v(i,j)$, $m_h(i,j)$, $m_{d-45}(i,j)$, $m_{d-135}(i,j)$ and $m_{nd}(i,j)$ respectively, denote vertical, horizontal, 45 degree, 135 degree and non-directional edge magnitudes for a $(i,j)^{th}$ image-block; $a_k(i,j)$ denotes an average gray level for a sub-block labeled k in the $(i,j)^{th}$ image-block and $f_v(k)$, $f_h(k)$, $f_{d-45}(k)$, $f_{d-135}(k)$ and $f_{nd}(k)$ denote, respectively, filter coefficients for the vertical, horizontal, 45 degree, 135 degree and non-directional edges where k=0, 1, 2 and 3, each representing a number labeling each sub-block.

Referring to FIGS. 5A to 5E, there are shown filter coefficients for each edge.

As shown, reference numerals 501, 503, 505, 507 and 509 show filter coefficients for the vertical, horizontal, 45 degree, 135 degree and non-directional edges, respectively. Each image-block can be represented by using a selected one among five edge magnitudes, wherein each magnitude is calculated for respective edges.

In order to determine an edge corresponding to an image-block, the five edge magnitudes obtained by using the above equations are compared with each other. According to the comparison, the image-block is expressed by the one edge having a maximum edge magnitude relative to the others, where the maximum edge magnitude should also be greater than a predetermined threshold value. If the maximum edge magnitude is less than the predetermined threshold value, it is determined that the image-block contains no edge.

When the selected edge for the image-block is determined as a result of the edge magnitude comparison, a corresponding edge histogram bin for the sub-image is increased by one. There are five types of edge histogram bins, i.e., vertical, horizontal, 45 degree, 135 degree and non-directional edge histogram bins. The five edge histogram bins are components for representing the edge histogram. The detection of corresponding edges for all of the image-blocks included in a sub-image is performed and then an edge histogram bin corresponding to each detected edge is increased by one to thereby generate an edge histogram, called a local edge histogram, for the sub-image. The detection of edges and generation of edge histogram are performed for all of the 16 sub-images.

The local edge histogram represents the distribution of the five types of edges in a sub-image, i.e., an edge histogram for a sub-image. Since the number of sub-images is fixed at 16 and each sub-image is assigned five edge histogram bins, 80 edge histogram bins are needed to generate corresponding local edge histograms for all of the 16 sub-images. That is, semantics of each bin of BinCounts is defined as shown in Table 1:

TABLE 1

| Edge histogram bin | Semantics |
| --- | --- |
| BinCounts[0] | Vertical edges in sub-image (0, 0) |
| BinCounts[1] | Horizontal edges in sub-immage (0, 0) |
| BinCounts[2] | 45 degree edges in sub-image (0, 0) |
| BinCounts[3] | 135 degree edges in sub-image (0, 0) |
| BinCounts[4] | Non-directional edges in sub-image (0, 0) |
| BinCounts[5] | Vertical edges in sub-image (0,1) |
| . | . |
| . | . |
| . | . |
| BinCounts[74] | Non-directional edges in sub-image (3, 2) |
| BinCounts[75] | Vertical edges in sub-image (3, 3) |
| BinCounts[76] | Horizontal edges in subimage (3, 3) |
| BinCounts[77] | 45 degree edges in sub-image (3, 3) |
| BinCounts[78] | 135 degree edges in sub-image (3, 3) |
| BinCounts[79] | Non-directional edges in sub-image (3, 3) | where BinCount[0], BinCount[1] . . . BinCount[79] represent final coded bits for the edge histogram descriptor.

Referring to FIG. 6, there is shown an exemplary array of 80 edge histogram bins corresponding to an image.

For example, a local edge histogram for a sub-image 211 at (0,0) of the image 200 shown in FIG. 2 includes vertical, horizontal, 45 degree, 135 degree and non-directional edge histogram bins 600, 601, 602, 603 and 604, respectively, as shown in FIG. 6. In the same way, a local edge histogram for a sub-image 212 at (0,1) in FIG. 2 includes five edge histogram bins 605, 606, 607, 608 and 609 in the same sequence as that of bins for the sub-image 211. Consequently, a total of 80 edge histogram bins are needed to generate respective 16 local edge histograms for all of the 16 sub-images, wherein the total 80 bins are calculated by multiplying five edge histogram bins by 16 sub-images.

In order to obtain a first image descriptor, each edge histogram bin in a local edge histogram for a sub-image is normalized by dividing each bin by the total number of the image-blocks included in the sub-image. Thereby, each edge histogram bin for the local edge histogram has a bin value ranging from 0 to 1. The normalized bin values for the image are then coupled to the processing block S105 shown in FIG. 1 as the first image descriptor. At the processing block S105, the first image descriptor is non-linearly quantized by using a number of quantization tables.

That is, in order to obtain a second image descriptor, the normalized bin values are quantized to obtain binary representations thereof. The quantization should be performed for the 80 normalized bin values. In this case, the normalized bin values are non-linearly quantized to be able to minimize the overall number of bits for the binary representations.

As a result, a group of quantization index values is obtained as the second image descriptor. The non-linear quantization is performed using a non-linear quantizer designed with, e.g., a Lloyd-Max algorithm in accordance with one embodiment of the present invention.

In order to perform the quantization, five non-linear quantization tables for each of vertical edge, horizontal edge, 45 degree edge, 135 degree edge and non-directional edge histogram bins are used therein, which are representatively set forth in Tables 2 to 6:

TABLE 2

Quantization Table for the Vertical Edge Histogram Bin

| Index(3 bits/bin) | Range | Representative value |
| --- | --- | --- |
| 0 | 0.0000000 ~ 0.0343910 | 0.010867 |
| 1 | 0.0343910 ~ 0.0787205 | 0.057915 |
| 2 | 0.0787205 ~ 0.1221875 | 0.099526 |
| 3 | 0.1221875 ~ 0.1702110 | 0.144849 |
| 4 | 0.1702110 ~ 0.2280385 | 0.195573 |
| 5 | 0.2280385 ~ 0.3092675 | 0.260504 |
| 6 | 0.3092675 ~ 0.4440795 | 0.358031 |
| 7 | 0.4440795 ~ 1.0000000 | 0.530128 |

TABLE 3

Quantization Table for the Horizontal Edge Histogram Bin

| Index(3 bits/bin) | Range | Representative value |
| --- | --- | --- |
| 0 | 0.0000000 ~ 0.0411000 | 0.012266 |
| 1 | 0.0411000 ~ 0.0979065 | 0.069934 |
| 2 | 0.0979065 ~ 0.1540930 | 0.125879 |
| 3 | 0.1540930 ~ 0.2128515 | 0.182307 |
| 4 | 0.2128515 ~ 0.2789795 | 0.243396 |
| 5 | 0.2789795 ~ 0.3631455 | 0.314563 |
| 6 | 0.3631455 ~ 0.4880235 | 0.411728 |
| 7 | 0.4880235 ~ 1.0000000 | 0.564319 |

TABLE 4

Quantization Table for the 45 Degree Edge Histogram Bin

| Index(3 bits/bin) | Range | Representative value |
| --- | --- | --- |
| 0 | 0.0000000 ~ 0.0150225 | 0.004193 |
| 1 | 0.0150255 ~ 0.0363560 | 0.025852 |
| 2 | 0.0363560 ~ 0.0576895 | 0.046860 |
| 3 | 0.0576895 ~ 0.0809025 | 0.068519 |
| 4 | 0.0809025 ~ 0.1083880 | 0.093286 |
| 5 | 0.1083880 ~ 0.1424975 | 0.123490 |
| 6 | 0.1424975 ~ 0.1952325 | 0.161505 |
| 7 | 0.1952325 ~ 1.0000000 | 0.228960 |

TABLE 5

Quantization Table for the 135 Degree Edge Histogram Bin

| Index(3 bits/bin) | Range | Representative value |
|---|---|---|
| 0 | 0.0000000 ~ 0.0150490 | 0.004174 |
| 1 | 0.0150490 ~ 0.0360780 | 0.025924 |
| 2 | 0.0360780 ~ 0.0566975 | 0.046232 |
| 3 | 0.0566975 ~ 0.0784090 | 0.067163 |
| 4 | 0.0784090 ~ 0.1025230 | 0.089655 |
| 5 | 0.1025230 ~ 0.1336475 | 0.115391 |
| 6 | 0.1336475 ~ 0.1848245 | 0.151904 |
| 7 | 0.1848245 ~ 1.0000000 | 0.217745 |

TABLE 6

Quantization Table for the Non-Directional Edge Histogram Bin

| Index(3 bits/bin) | Range | Representative value |
|---|---|---|
| 0 | 0.0000000 ~ 0.0292225 | 0.006778 |
| 1 | 0.0292225 ~ 0.0801585 | 0.051667 |
| 2 | 0.0801585 ~ 0.1374535 | 0.108650 |
| 3 | 0.1374535 ~ 0.1952415 | 0.166257 |
| 4 | 0.1952415 ~ 0.2549585 | 0.224226 |
| 5 | 0.2549585 ~ 0.3210330 | 0.285691 |
| 6 | 0.3210330 ~ 0.4036735 | 0.356375 |
| 7 | 0.4036735 ~ 1.0000000 | 0.450972 | where the optimal number of bits per bin is fixed at three in order to have eight quantization levels in the above quantization tables in accordance with present invention. The second image descriptor is then stored in the database S107 and is retrieved in response to an input of a query image.

Figure 7:
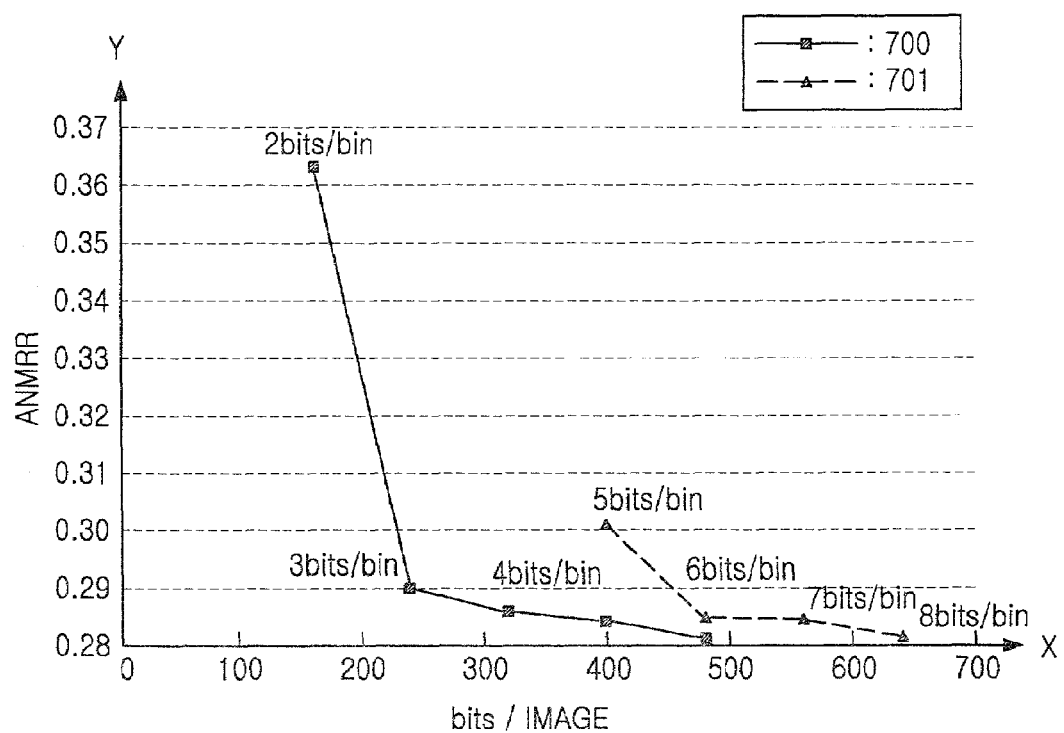
FIG. 7 is a graph showing the difference in the retrieval performance between a non-linear quantization using a Lloyd-Max quantizer and a linear quantization.

Referring to FIG. 7, there is shown a graph depicting the difference in retrieval performance between a non-linear quantization using a Lloyd-Max quantizer and a linear quantization.

As shown, the Y axis of the graph represents an average normalized modified retrieval rank (ANMRR) indicating the retrieval performance, and the X axis represents the number of bits per image based on the number of bits per edge bin in generating the quantization tables. A solid line 700 and a broken line 701 show retrieval performances when using the non-linear quantization and the linear quantization, respectively.

As can be seen from the solid line 700, if the number of bits per edge bin is three, the number of bits per image is 240, obtained by multiplying three bits by 80 edge histogram bins. The ANMRR takes a real number between 0 and 1. As the ANMRR is closer to 0, the retrieval performance, i.e., retrieval accuracy, is better. Accordingly, it can be readily appreciated that assignment of three bits to each edge histogram bin leads to the most efficient encoding in consideration of both retrieval performance and bit generation quantity.

Figure 8A:
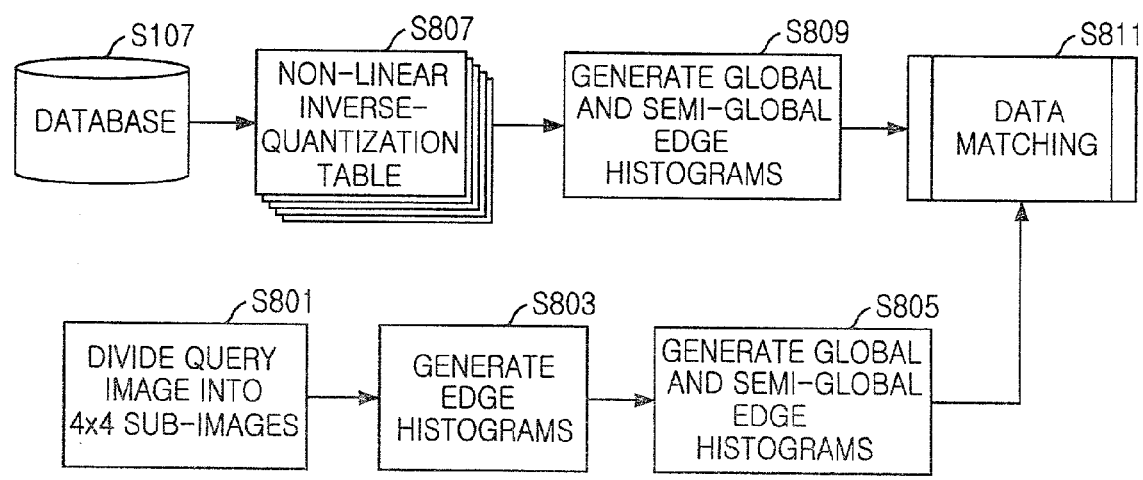
FIGS. 8A and 8B depict two block diagrams, each showing a process for retrieving a desired image in response to an input of query image in accordance with the present invention.
Figure 8B:
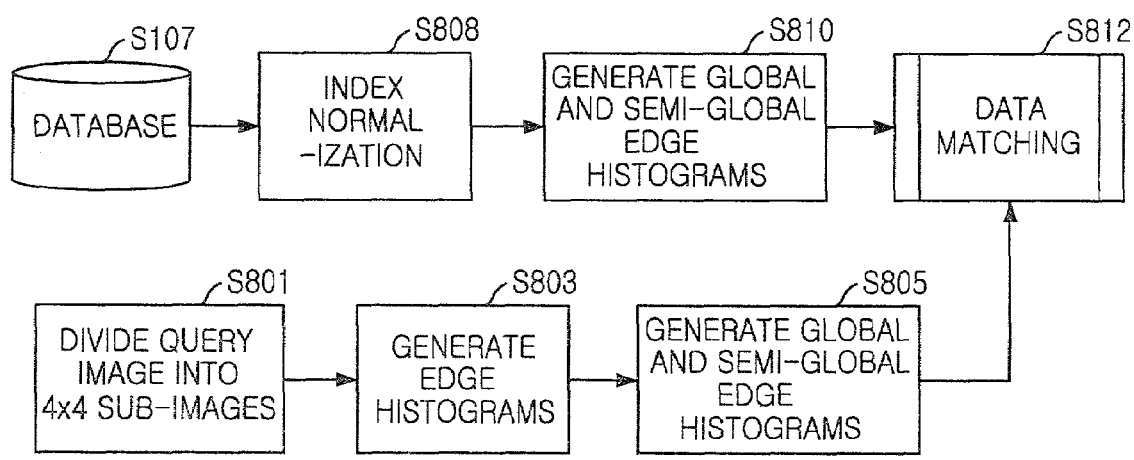

Referring to FIGS. 8A and 8B, there are shown block diagrams illustrating two methods for retrieving a desired image in response to an input of query image in accordance with a preferred embodiment of the present invention.

If a query image is received, the query image is processed in the same manner of the processing blocks S101 and S103 shown in FIG. 1. That is, a first image descriptor for the query image is obtained in the above described manner and includes normalized edge histogram bins for the query image.

Thereafter, local edge histograms, a global edge histogram and semi-global edge histograms for the query image are generated based on the normalized edge histogram bins as an image descriptor. The global edge histogram represents the edge distribution for the whole image space. The global edge histogram and the semi-global histograms will be described hereinafter in more detail.

On the other hand, according to FIG. 8A, there is shown a first method for retrieving a desired image in response to an input of a query image by using a number of non-linear inverse quantization tables in accordance with a preferred embodiment of the present invention, wherein the non-linear inverse tables can be of Tables 2, 3, 4, 5 and 6 as described above.

When a query image is inputted, the same process as that in the processing block S101, i.e., the image division process is performed at a processing block S801.

At a processing block S803, the same process as that in the processing block S103, i.e., the edge histogram generation, is performed.

In order to achieve a high retrieval performance, a global edge histogram and semi-global edge histograms for the query image can be further generated at a processing block S805, based on the local edge histogram bins that are generated at the processing block S803.

For a data matching process, a number of second image descriptors for target images are retrieved sequentially from the pre-established database S107. For a stored target image, a group of quantization index values are retrieved and coupled to the non-linear inverse-quantization tables S807. Through the use of the non-linear inverse-quantization tables, the quantization index values are then converted into normalized edge histogram bins for the target image.

At a processing block S809, the normalized edge histogram bins are then used in extracting local edge histograms, a global edge histogram and semi-global edge histograms for the target image. That is, in order to achieve a high retrieval performance, the local edge histograms having the normalized edge histogram bins, the global edge histogram and the semi-global edge histograms are used in the data matching process as an image descriptor for a target image. In the data matching process S811, by calculating a distance between the local, semi-global and global edge histograms of the query image A and the target image B, a similarity between the two images is determined as follows:

$$\text{Distance }(A, B) = \sum_{i=0}^{79} |Local\_A[i] - Local\_B[i]| + \qquad \text{Eq. 6}$$

$$5 \times \sum_{i=0}^{4} |Global\_A[i] - Global\_B[i]| +$$

$$\sum_{i=0}^{64} |Semi\_Global\_A[i] - Semi\_Global\_B[i]|$$

where Local_A[i] and Local_B[i] denote, respectively, index values assigned to $i^{th}$ bins of each of local edge histograms of the images A and B; Global_A[] and Global_B[] denote, respectively, index values assigned to $i^{th}$ bins of each of global edge histograms of the images A and B; and Semi_Global_A[] and Semi_Global_B[] denote, respectively, index values assigned to $i^{th}$ bins of each of semi-global edge histograms of the images A and B. Since the number of bins for the global edge histogram is relatively smaller than that of the local and semi-global edge histograms, a weighting factor of five is applied in the above equation.

As explained above, using equation 6, the similarity between the two images A and B can be measured by referring to the inverse quantization tables. In this case, since edge histogram bin values for the image should be decoded by referring to the inverse quantization tables, equation 6 is generally used in applications for complicated but accurate retrieval. Herein, each of the inverse quantization tables corresponds to each of the edge quantization tables shown in Tables 2 to 6.

The above procedure is then repeated until all of the target images are processed.

On the other hand, according to FIG. 8B, there is shown a second method for retrieving a desired image in response to an input of query image without using a number of non-linear inverse quantization tables in accordance with a preferred embodiment of the present invention. That is, in the second method, the local edge histograms for an image can be restored at a high speed without the above inverse quantization tables.

For an inputted query image, the processing blocks S801, S803 and S805 are performed as described hereinbefore.

At a processing block S808, a set of quantization index values are retrieved from the database S107 and normalized to thereby generate a set of normalized index values. The set of normalized index values is then coupled to a processing block S810.

At a processing block S810, the normalized index values are used as values of edge histogram bins for the stored image. That is, a global edge histogram and semi-global edge histograms for the stored image are generated based on the values of normalized edge histogram bins, called local edge histogram bin values of the decoded image.

In a processing block S812, by calculating a distance between the image descriptor having the local, semi-global and global edge histograms of the query image and those of the decoded image, a similarity between the two images, i.e., the query image A and the target image B, is determined.

Since there is a monotonic increment of the edge histogram bin values in the non-linear quantization tables, each of the quantization tables in accordance with the present invention has a linearly incremental characteristic in some sections around 0 where an edge occurrence probability is high. This means that a set of index values itself can be used as a similarity measurement value in the image retrieval process without referring to the inverse quantization tables.

The following equation 7 is applied to obtain the distance of edge histograms between two images A and B obtained directly based on the index values for the stored image as follows:

$$\text{Distance }(A, B) = \sum_{i=0}^{79} |Local\_A[i] - Local\_B[i]| + \qquad \text{Eq. 7}$$
$$5 \times \sum_{i=0}^{4} |Global\_A[i] - Global\_B[i]| +$$
$$\sum_{i=0}^{64} |Semi\_Global\_A[i] - Semi\_Global\_B[i]|$$

Using equation 7, similarity can also be measured by using a set of encoded index values itself in consideration of a partially linear characteristic of the inverse quantization table. Therefore, it can be seen that a retrieval process described in FIG. 8B is faster than that described in FIG. 8A.

Figure 9A:
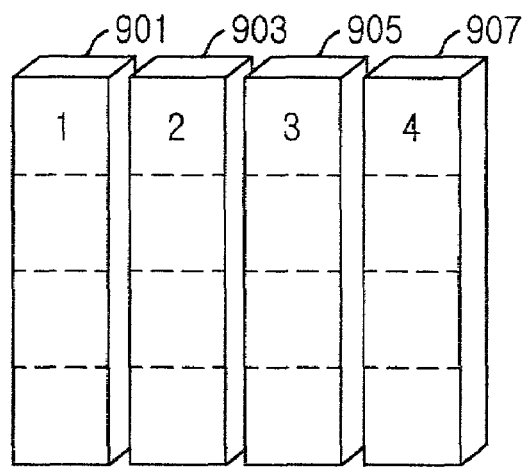
FIGS. 9A to 9C are explanatory diagrams demonstrating 13 groups of sub-images provided for representing semi-global edge histograms in accordance with the present invention.
Figure 9B:
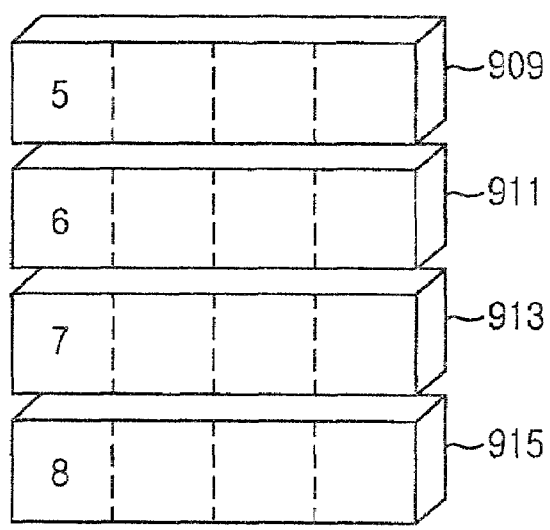
Figure 9C:
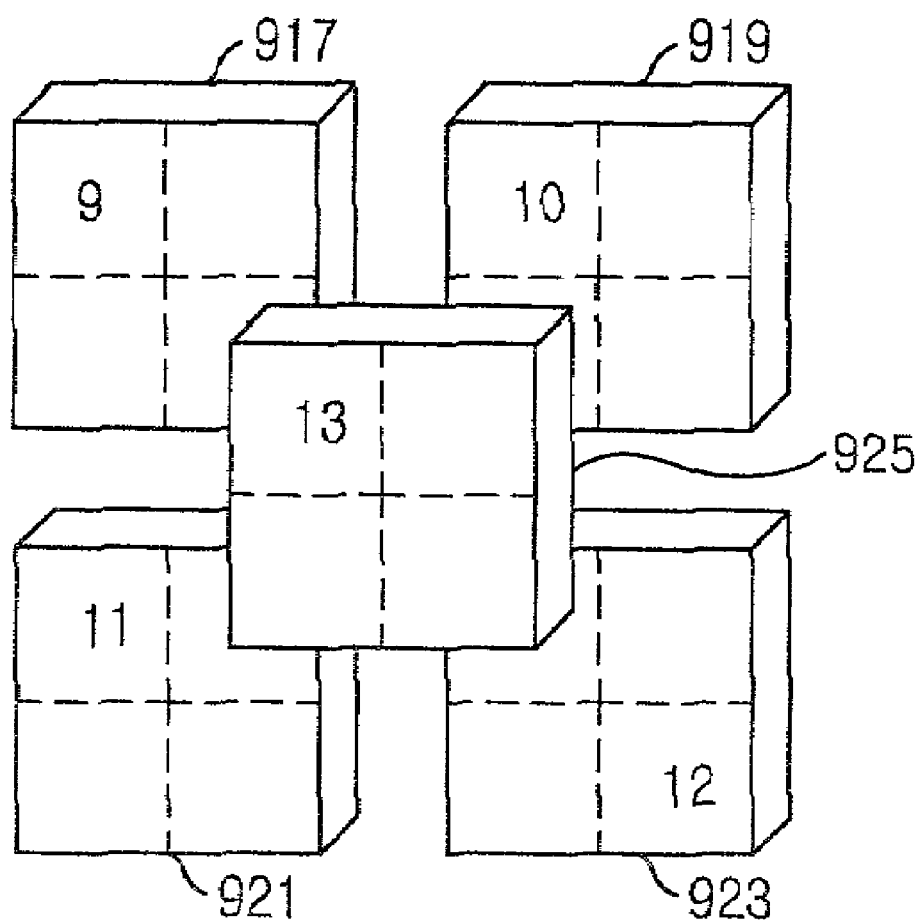

Referring to FIGS. 9A to 9C there are shown exemplary diagram illustrating 13 groups of sub-images provided for semi-global edge histograms in accordance with a preferred embodiment of the present invention.

In setting up image regions for edge detection, as shown in FIG. 2, the image is divided vertically and horizontally into four equal parts to form 16 sub-images, and one local edge histogram for each sub-image is generated. Also, because 16 sub-images can always be formed irrespective of the image size, the quantization index values of the image can be encoded in a fixed length of bits and stored in the database.

The local edge histograms encoded from each sub-image can be merged and reused to thereby obtain additional edge histograms of a global edge histogram and semi-global edge histograms.

The global edge histogram is generated by merging the local edge histogram for each of 16 sub-images in an image. As aforementioned, each edge histogram has five edge histogram bins, i.e., the vertical, horizontal, 45 degree, 135 degree and non-directional edge histogram bins. To merge 16 local edge histograms, it is necessary to add the 16 vertical edge histogram bins from each edge histogram together. In the same way, the summation is performed for horizontal, 45 degree, 135 degree and non-directional edge histogram bins. Accordingly, the edge distribution information for the whole image can be acquired from the global edge histogram.

Referring again to FIGS. 9A to 9C, four sets of four sub-images, each set included in each of columns 1 to 4 in vertical direction, are, in sequence, set to $1^{st}$ to $4^{th}$ sets of the sub-images 901, 903, 905 and 907 and four sets of four sub-images, each set included in each of rows 5 to 8 in horizontal direction, are, in sequence, set to $5^{th}$ to $8^{th}$ sets of four sub-images 909, 911, 913 and 915, respectively. Also, five sets of four sub-images are set to $9^{th}$, $10^{th}$, $11^{th}$, $12^{th}$ and $13^{th}$ sets of sub-images 917, 919, 921, 923 and 925. Each of $9^{th}$ to $12^{th}$ sets 917, 919, 921 and 923, respectively, has a sub-image located on the left-top, on the right-top, on the left-bottom and on the right-bottom of the image and the $13^{th}$ set 925 has four sub-images around the center of the image. The $1^{st}$ to $13^{th}$ sets of sub-images 901 to 925 include 65 edge histogram bins which are obtained by multiplying 13, denoting the total number of the sub-images, by five, denoting the number of edge histogram bins for each sub-image. Consequently, there are generated semi-global edge histograms having 65 edge histogram bins for the 13 sets of four sub-images.

By using the 65 edge histogram bins for the semi-global edge histograms and five edge histogram bins for the global edge histogram as well as the 80 edge histogram bins for the local edge histogram in order to determine similarity between two images, the retrieval efficiency of the system is improved.

Especially, by selecting the above 13 sets of four sub-images to generate the semi-global edge histograms, the retrieval performance can be improved because the 13 sets have a characteristic less sensitive to a location change of objects in the image.

In accordance with the present invention, the number of bits necessary for storing the quantization index values can be greatly reduced. Furthermore, the complexity of the similarity calculation can be significantly decreased by using the non-linear quantizer.

Although the preferred embodiments of the invention have been disclosed for illustrative purpose, those skilled in the art will appreciate that various modifications, additions, and substitutions are possible, without departing from the scope and spirit of the invention as disclosed in the accompanying claims.

What is claimed is:

1. A method for constructing a database having image information representing a plurality of images, the method comprising the steps of:

a) calculating L×5 number of normalized edge histogram bins to generate L number of edge histograms of a target image, wherein said each edge histogram has five normalized edge histogram bins and represents a spatial distribution of five reference edges in a sub-image and L is a positive integer, wherein the reference edges include four directional edges and a non-directional edge;

b) non-linearly quantizing the L×5 number of normalized edge histogram bins to generate L×5 number of quantization index values for the target image;

c) storing the L×5 number of quantization index values to the database; and d) repeating the steps a) to c) until all of the stored imaged are processed to thereby construct the database having the image information.

2. The method as recited in claim 1, wherein the directional edges include a vertical edge, a horizontal edge, a 45 degree edge and a 135 degree edge, and the non-directional edge represents an edge of undesignated direction excluding the four directional edges.

3. The method as recited in claim 2, wherein the vertical edge, the horizontal edge, the 45 degree edge, the 135 degree edge and the non-directional edge are, respectively, expressed as:

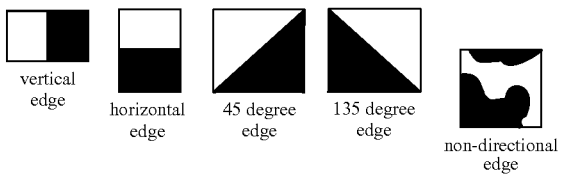

4. The method as recited in claim 3, wherein the step a) includes the steps of:

a1) partitioning the target image into L number of sub-images, wherein each sub-image is further partitioned into S×K number of image-blocks, S and K being positive integers; and a2) assigning one of the reference edges to each image-block to thereby generate L number of edge histograms for the target image, wherein each edge histogram includes the L×5 edge histogram bins; and a3) normalizing the edge histogram bins by S×K which is the number of the image-blocks contained in one sub-image, to thereby generate L×5 number of normalized edge histogram bins, each normalized edge histogram bin having a real number between 0 and 1.

5. The method as recited in claim 4, wherein the step a1) includes the steps of:

a1-1) dividing the target image into N×N non-overlapping sub-images to thereby form L number of rectangular sub-images, N being a positive integer; and a1-2) dividing each sub-image into S×K non-overlapping blocks to thereby form S×K number of rectangular image-blocks.

6. The method as recited in claim 5, wherein the step a2) includes the steps of:

a2-1) assigning one of the reference edges to each image block; and a2-2) counting the number of each reference edge included in each sub-image to generate the L number of the edge histograms for the target image.

7. The method as recited in claim 6, wherein the step a2-1) includes the steps of:

a2-11) dividing each image-block into 2×2 sub-blocks;

a2-12) assigning a corresponding filter coefficient to each sub-block;

a2-13) calculating a set of five edge magnitudes corresponding to five edges for each image-block by using the filter coefficient; and a2-14) expressing the image-block as an edge having a maximum edge magnitude by comparing the calculated edge magnitudes to each other.

8. The method as recited in claim 7, wherein the five edge magnitudes are obtained by using five equations, which are expressed as:

$$m_v(i, j) = \left| \sum_{k=0}^{3} a_k(i, j) \times f_v(k) \right|;$$

$$m_h(i, j) = \left| \sum_{k=0}^{3} a_k(i, j) \times f_h(k) \right|;$$

$$m_{d-45}(i, j) = \left| \sum_{k=0}^{3} a_k(i, j) \times f_{d-45}(k) \right|;$$

$$m_{d-135}(i, j) = \left| \sum_{k=0}^{3} a_k(i, j) \times f_{d-135}(k) \right|;$$

and $$m_{nd}(i, j) = \left| \sum_{k=0}^{3} a_k(i, j) \times f_{nd}(k) \right|,$$

where $m_v(i, j)$, $m_h(i, j)$, $m_{d-45}(i, j)$, $m_{d-135}(i, j)$ and $m_{nd}(i, j)$, respectively, denote vertical, horizontal, 45 degree, 135 degree and non-directional edge magnitudes for a $(i, j)^{th}$ image-block; $a_k(i, j)$ denotes an average gray level for a sub-block assigned k in the $(i, j)^{th}$ image-block and $f_v(k)$, $f_h(k)$, $f_{d-45}(k)$, $f_{d-135}(k)$ and $f_{nd}(k)$ denote, respectively, filter coefficients for the vertical, horizontal, 45 degree, 135 degree and non-directional edges, where k represents a number assigned to each sub-block.

9. The method as recited in claim 7, wherein the image block is expressed as containing no edge when the maximum edge magnitude is less than a predetermined threshold value.

10. The method as recited in claim 6, wherein semantics of said each edge histogram bin of BinCounts is defined as:

| Edge histogram bin | Semantics |
| --- | --- |
| BinCounts[0] | Vertical edges in sub-image (0,0) |
| BinCounts[1] | Horizontal edges in sub-image (0,0) |
| BinCounts[2] | 45 degree edges in sub-image (0,0) |

-continued

| Edge histogram bin | Semantics |
|---|---|
| BinCounts[3] | 135 degree edges in sub-image (0,0) |
| BinCounts[4] | Non-directional edges in sub-image (0,0) |
| BinCounts[5] | Vertical edges in sub-image (0,1) |
| . | . |
| . | . |
| . | . |
| BinCounts[74] | Non-directional edges in sub-image (3,2) |
| BinCounts[75] | Vertical edges in sub-image (3,3) |
| BinCounts[76] | Horizontal edges in sub-image (3,3) |
| BinCounts[77] | 45 degree edges in sub-image (3,3) |
| BinCounts[78] | 135 degree edges in sub-image (3,3) |
| BinCounts[79] | Non-directional edges in sub-image (3,3). |

11. The method as recited in claim 5, wherein said N is 4.

12. The method as recited in claim 1, wherein the step b) includes the step of b1) non-linearly quantizing each of the normalized edge histogram bins by using a corresponding non-linear quantization table, wherein the step b1) is provided with five non-linear quantization tables, each corresponding to a particular reference edge.

13. The method as recited in claim 12, wherein the step b1) includes the steps of:
   b2-1) mapping each of the normalized edge histogram bins into a representative value contained in each corresponding reference edge quantization table; and
   b2-2) generating three bits of a quantization index value representing a representative value for each normalized edge histogram bin to thereby generate L×5 number of the quantization index values as a second image descriptor for the target image.

14. The method as recited in claim 12, wherein the normalized edge histogram bins are non-linearly quantized using a non-linear quantizer based on a Lloyd-Max algorithm.

15. The method as recited in claim 14, wherein the quantization table includes a table for a vertical edge histogram bin representing the number of vertical edges in the sub-image, which is expressed as:

| Index | Range | Representative value |
|---|---|---|
| 0 | 0.0000000 ~ 0.0343910 | 0.010867 |
| 1 | 0.0343910 ~ 0.0787205 | 0.057915 |
| 2 | 0.0787205 ~ 0.1221875 | 0.099526 |
| 3 | 0.1221875 ~ 0.1702110 | 0.144849 |
| 4 | 0.1702110 ~ 0.2280385 | 0.195573 |
| 5 | 0.2280385 ~ 0.3092675 | 0.260504 |
| 6 | 0.3092675 ~ 0.4440795 | 0.358031 |
| 7 | 0.4440795 ~ 1.0000000 | 0.530128. |

16. The method as recited in claim 14, wherein the quantization table further includes a table for a horizontal edge histogram bin representing the number of horizontal edges in the sub-image, which is expressed as:

| Index | Range | Representative value |
|---|---|---|
| 0 | 0.0000000 ~ 0.0411000 | 0.012266 |
| 1 | 0.0411000 ~ 0.0979065 | 0.069934 |
| 2 | 0.0979065 ~ 0.1540930 | 0.125879 |
| 3 | 0.1540930 ~ 0.2128515 | 0.182307 |
| 4 | 0.2128515 ~ 0.2789795 | 0.243396 |
| 5 | 0.2789795 ~ 0.3631455 | 0.314563 |
| 6 | 0.3631455 ~ 0.4880235 | 0.411728 |
| 7 | 0.4880235 ~ 1.0000000 | 0.564319. |

17. The method as recited in claim 14, wherein the quantization table further includes a table for a 45 degree edge histogram bin representing the number of 45 degree edges in the sub-image, which is expressed as:

| Index | Range | Representative value |
|---|---|---|
| 0 | 0.0000000 ~ 0.0150225 | 0.004193 |
| 1 | 0.0150255 ~ 0.0363560 | 0.025852 |
| 2 | 0.0363560 ~ 0.0576895 | 0.046860 |
| 3 | 0.0576895 ~ 0.0809025 | 0.068519 |
| 4 | 0.0809025 ~ 0.1083880 | 0.093286 |
| 5 | 0.1083880 ~ 0.1424975 | 0.123490 |
| 6 | 0.1424975 ~ 0.1952325 | 0.161505 |
| 7 | 0.1952325 ~ 1.0000000 | 0.228960. |

18. The method as recited in claim 14, wherein the quantization table further includes a table for a 135 degree edge histogram bin representing the number of 135 degree edges in the sub-image, which is expressed as:

| Index | Range | Representative value |
|---|---|---|
| 0 | 0.0000000 ~ 0.0150490 | 0.004174 |
| 1 | 0.0150490 ~ 0.0360780 | 0.025924 |
| 2 | 0.0360780 ~ 0.0566975 | 0.046232 |
| 3 | 0.0566975 ~ 0.0784090 | 0.067163 |
| 4 | 0.0784090 ~ 0.1025230 | 0.089655 |
| 5 | 0.1025230 ~ 0.1336475 | 0.115391 |
| 6 | 0.1336475 ~ 0.1848245 | 0.151904 |
| 7 | 0.1848245 ~ 1.0000000 | 0.217745. |

19. The method as recited in claim 14, wherein the quantization table further includes a table for a non-directional edge histogram bin representing the number of non-directional edges, which is expressed as:

| Index | Range | Representative value |
|---|---|---|
| 0 | 0.0000000 ~ 0.0292225 | 0.006778 |
| 1 | 0.0292225 ~ 0.0801585 | 0.051667 |
| 2 | 0.0801585 ~ 0.1374535 | 0.108650 |
| 3 | 0.1374535 ~ 0.1952415 | 0.166257 |
| 4 | 0.1952415 ~ 0.2549585 | 0.224226 |
| 5 | 0.2549585 ~ 0.3210330 | 0.285691 |
| 6 | 0.3210330 ~ 0.4036735 | 0.356375 |
| 7 | 0.4036735 ~ 1.0000000 | 0.450972. |

20. A method for retrieving corresponding images in response to a query image based on a database, the method comprising the steps of:
   a) calculating L number of local edge histograms of the query image as an image descriptor for the query image, wherein each local edge histogram represents a spatial distribution of five reference edges in a sub-image and L is a positive integer, wherein the reference edges include four directional edges and a non-directional edge;

b) extracting a plurality of image descriptors for target images based on image information from the database, wherein the image descriptor for each target image includes L number of local edge histograms for each target image;

c) comparing the image descriptor for the query image with each image descriptor for the target images to generate a comparison result; and d) retrieving at least one target image similar to the query image based on the comparison result.

21. The method as recited in claim 20, wherein each local edge histogram has five edge histogram bins corresponding to the reference edges.

22. The method as recited in claim 20, wherein the directional edges include a vertical edge, a horizontal edge, a 45 degree edge and a 135 degree edge, and the non-directional edge represents an edge of undesignated direction excluding the four directional edges.

23. The method as recited in claim 22, wherein the step a) includes the steps of:

a1) partitioning the query image into N×N non-overlapping sub-images to thereby form L number of rectangular sub-images, wherein each sub-image is further partitioned into S×K number of image-blocks, S and K being positive integers; and a2) assigning one of the reference edges to each image-block to thereby generate L number of edge histograms for the query image, wherein the edge histogram includes the L×5 edge histogram bins; and a3) normalizing the edge histogram bins by S×K which is the number of image-blocks contained in one sub-image, to thereby generate L×5 number of normalized edge histogram bins, each normalized edge histogram bin having a real number between 0 and 1.

24. The method as recited in claim 23, wherein the step a2) includes the steps of:

a2-1) assigning one of the reference edges to each image block; and a2-2) counting the number of each reference edge included in each sub-image to generate the L number of the edge histograms for the query image.

25. The method as recited in claim 24, wherein the step a2-1) includes the steps of:

a2-11) dividing each image-block into 2×2 sub-blocks;

a2-12) assigning a corresponding filter coefficient to each sub-block;

a2-13) calculating a set of five edge magnitudes corresponding to five edges for each image-block by using the filter coefficient; and a2-14) expressing the image-block as an edge having a maximum edge magnitude by comparing the calculated edge magnitudes to each other.

26. The method as recited in claim 25, wherein the five edge magnitudes are obtained by using five equations, which are expressed as:

$$m_v(i, j) = \left|\sum_{k=0}^{3} a_k(i, j) \times f_v(k)\right|;$$

$$m_h(i, j) = \left|\sum_{k=0}^{3} a_k(i, j) \times f_h(k)\right|;$$

$$m_{d-45}(i, j) = \left|\sum_{k=0}^{3} a_k(i, j) \times f_{d-45}(k)\right|;$$

-continued $$m_{d-135}(i, j) = \left|\sum_{k=0}^{3} a_k(i, j) \times f_{d-135}(k)\right|;$$

and $$m_{nd}(i, j) = \left|\sum_{k=0}^{3} a_k(i, j) \times f_{nd}(k)\right|,$$

where $m_v(i, j)$, $m_h(i, j)$, $m_{d-45}(i, j)$, $m_{d-135}(i, j)$ and $m_{nd}(i, j)$, respectively, denote vertical, horizontal, 45 degree, 135 degree and non-directional edge magnitudes for a $(i, j)^{th}$ image-block; $a_k(i, j)$ denotes an average gray level for a sub-block assigned k in the $(i, j)^{th}$ image-block and $f_v(k)$, $f_h(k)$, $f_{d-45}(k)$, $f_{d-135}(k)$ and $f_{nd}(k)$ denote, respectively, filter coefficients for the vertical, horizontal, 45 degree, 135 degree and non-directional edges, where k represents a number assigned to each sub-block.

27. The method as recited in claim 25, wherein the image block is expressed as containing no edge when the maximum edge magnitude is less than a predetermined threshold value.

28. The method as recited in claim 20, wherein the image descriptors for the query and target images further include a global edge histogram and R number of the semi-global histograms based on the L×5 number of normalized edge histogram bins, respectively, with R being a positive integer.

29. The method as recited in claim 28, wherein the global edge histogram represents an edge distribution in a whole space of the query and target images and each semi-global edge histogram represents an edge distribution in a corresponding set of sub-images of the query and target images.

30. The method as recited in claim 28, wherein said N and R are 4 and 13, respectively.

31. The method as recited in claim 30, wherein each of the 13 semi-global edge histograms is generated for each of 13 sets of four sub-images, the 13 sets including four sets of four sub-images, each set including four sub-images in each of first to fourth columns of the image in a vertical direction; four sets of four sub-images, each set including four sub-images in each of first to fourth rows in a horizontal direction; four sets of four sub-images, each set including a corresponding sub-image and three sub-images neighboring the corresponding sub-image, wherein the corresponding sub-image is respectively located on a left-top, on a right-top, on a left-bottom and on a right-bottom of the image; and a set including four sub-images around a center of the image.

32. The method as recited in claim 20, wherein the step b) includes the steps of:

b1) retrieving L×5 number of quantization index values for each of the target images;

b2) converting each of the L×5 number of quantization index values into L×5 number of normalized edge histogram bins for each target image by using five non-linear inverse quantization tables; and b3) generating L number of local edge histograms based on the L×5 number of normalized edge histogram bins.

33. The method as recited in claim 32, wherein the step b) further includes the step of: b4) further generating a global edge histogram and R number of semi-global histograms for each of the target images based on the L×5 number of normalized edge histogram bins.

34. The method as recited in claim 33, wherein the step c) includes the step of:

estimating a distance between the query image and said each target image by an equation as:

$$\text{Distance}(A, B) = \sum_{i=0}^{79} |Local\_A[i] - Local\_B[i]| + 5 \times \sum_{i=0}^{4} |Global\_A[i] - Global\_B[i]| + \sum_{i=0}^{64} |Semi\_Global\_A[i] - Semi\_Global\_B[i]|$$

where Local_A[i] and Local_B[i] denote, respectively, the edge histogram bins of BinCount[i] of the query image A and the target image B; Global_A[] and Global_B[] denote, respectively, the edge histogram bins for the global edge histograms of the query image A and the target image B; and Semi_Global_A[] and Semi_Global_B[] denote, respectively, the histogram bin values for the semi-global edge histogram bins of the query image A and the target image B.

35. The method as recited in claim 20, wherein the step b) includes the steps of:

b1) retrieving L×5 number of quantization index values for each of the target images;

b2) converting each of the L×5 number of quantization index values into L×5 number of normalized edge histogram bins for each target image by normalizing the L×5 number of quantization index values; and b3) generating L number of local histograms based on the L×5 number of normalized edge histogram bins.

36. The method as recited in claim 34, wherein the step b) further includes the step of: b4) further generating a global edge histogram and R number of semi-global histograms for each of the target images based on the L×5 number of normalized edge histogram bins.

37. The method as recited in claim 36, wherein the step c) includes the step of:

estimating a distance between the query image and said each target image by an equation as:

$$\text{Distance}(A, B) = \sum_{i=0}^{79} |Local\_A[i] - Local\_B[i]| + 5 \times \sum_{i=0}^{4} |Global\_A[i] - Global\_B[i]| + \sum_{i=0}^{64} |Semi\_Global\_A[i] - Semi\_Global\_B[i]|$$

where Local_A[i] and Local_B[i] denote, respectively, the edge histogram bins of BinCount[i] of the query image A and the target image B; Global_A[] and Global_B[] denote, respectively, the edge histogram bins for the global edge histograms of the query image A and the target image B; and Semi_Global_A[] and Semi_Global_B[] denote, respectively, the histogram bin values for the semi-global edge histogram bins of the query image A and the target image B.

38. A method for constructing a bit-representation of an edge histogram descriptor for a target image, comprising the steps of:

a) partitioning the target image into 16 sub-images, wherein each sub-image is further partitioned into S×K number of image-blocks, S and K being positive integers;

b) assigning one of five reference edges to each image-block to thereby generate 16 edge histograms for the target image, wherein the edge histogram includes the 80 edge histogram bins and the reference edges include four directional edges and a non-directional edge;

c) normalizing the edge histogram bins contained in each edge histogram by S×K to thereby generate 80 normalized edge histogram bins, each normalized edge histogram bin having a real number between 0 and 1; and d) non-linearly quantizing 80 normalized edge histogram bins to generate 80 quantization index values as a second image descriptor for the target image.

39. The method as recited in claim 38, wherein each quantization index value is represented by three bits.

40. The method as recited in claim 39, wherein the directional edges include a vertical edge, a horizontal edge, a 45 degree edge and a 135 degree edge, and the non-directional edge represents an edge of undesignated direction excluding the four directional edges.

* * * * *